United States Patent [19]
Gernert

[11] Patent Number: 5,862,656
[45] Date of Patent: Jan. 26, 1999

[54] FORAGE HARVESTER AND METHOD OF OPERATING THE SAME

[75] Inventor: Siegfried Gernert, Bad-Waldsee, Germany

[73] Assignee: Claas Saulgau GmbH, Saulgau, Germany

[21] Appl. No.: 994,574

[22] Filed: Dec. 19, 1997

[30] Foreign Application Priority Data

Dec. 20, 1996 [DE] Germany .................. 196 53 367.8

[51] Int. Cl.⁶ .......................... A01D 45/00; A01F 12/00
[52] U.S. Cl. .................. 56/105; 241/101.2; 241/222; 241/101.77; 460/113; 56/DIG. 1
[58] Field of Search .................... 460/112, 113; 56/60, 504, 505, 53, DIG. 1, DIG. 6; 241/101.2, 222, 101.77

[56] References Cited

U.S. PATENT DOCUMENTS

| | | | |
|---|---|---|---|
| 4,068,453 | 1/1978 | Hill et al. ........................ | 56/DIG. 1 |
| 4,265,076 | 5/1981 | Krutz ................................ | 56/DIG. 1 |
| 5,379,580 | 1/1995 | Gropp et al. ..................... | 56/192 |

OTHER PUBLICATIONS

Deutz–Fahr Gigant, Die Erntesystem–Spezialisten; None Dated Material.

*Primary Examiner*—Thomas B. Will
*Assistant Examiner*—Arpad Fabian Kovacs
*Attorney, Agent, or Firm*—Michael J. Striker

[57] ABSTRACT

In a forage harvester having a mechanically driven front attachment and hydrostatically driven compression rollers, the front attachment can be disconnected from its mechanical drive and instead connected with a hydrostatic drive of the compression rollers so as to be driven by the hydrostatic drive.

6 Claims, 1 Drawing Sheet

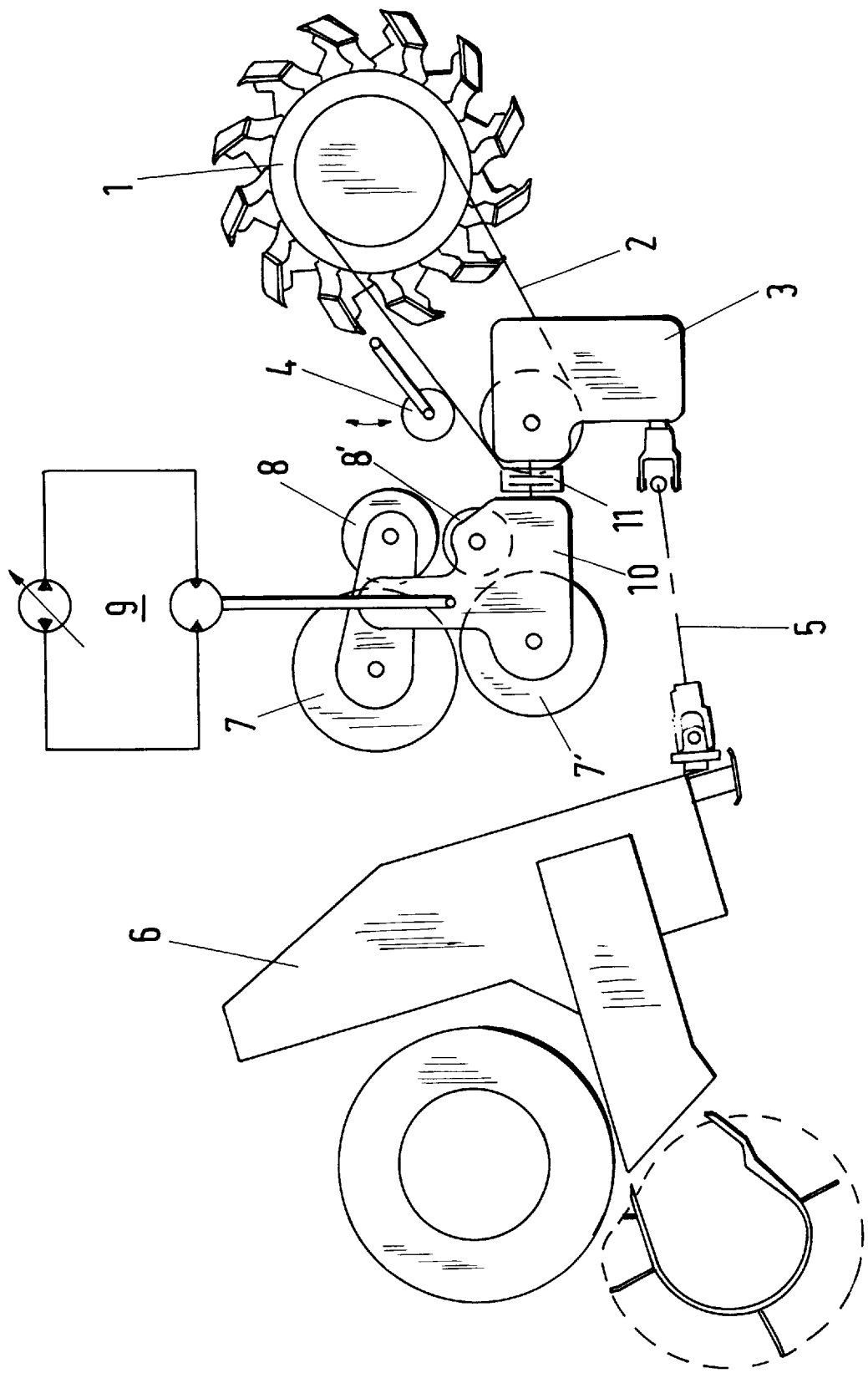

FORAGE HARVESTER AND METHOD OF OPERATING THE SAME

BACKGROUND OF THE INVENTION

The present invention generally relates to a forage harvester and a method of operating the forage harvester.

Known forage harvesters have a front attachment and compression rollers which are arranged before a chopper drum in a product transporting direction and driven mechanically and rigidly through a belt drive and toothed gears. Therefore it is possible to transmit a high power with a fixed rotary speed. On the other hand, it is known for example from the prospectus "Deutz-Fahr betreffend GIGANT" with printing code 91 525 01-9511 to hydrostatically and steplessly drive the compression rollers and harvesting attachment. Such a drive is elastic and easily controllable.

SUMMARY OF THE INVENTION

Accordingly, it is an object of present invention to provide a forage harvester and a method of operating the same, which can combine the advantages of a rigid mechanical drive with the advantageous of a hydrostatic drive in condition of application of various loads to the harvesting attachment and compression rollers, in particular during reversing of the attachment and compression rollers.

In keeping with these objects and with others which will become apparent hereinafter, one feature of present invention resides, briefly stated, in a forage harvester in which a front attachment which is usually driven by a mechanical drive, is connectable with and disconnectable from the hydrostatic drive of the compression rollers so as to be driven also by the hydrostatic drive of the compression rollers when needed.

In accordance with another feature of present invention, a method of operating a forage harvester is proposed, in which the compression rollers are drivable hydrostatically and regulatably, and also the front attachment, after switching off from the mechanical drive during reversing, is driven hydrostatically by switching to the hydrostatic drive of the compression rollers.

When the forage harvester is designed and the method of operating the forage harvester is performed in accordance with the present invention, the advantages of a rigid mechanical drive are combined with the advantages of a hydrostatic drive during various operations of the harvesting attachment and the compressing rollers.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

The single FIGURE of the drawing is a view schematically showing a forage harvester which is designed and operates in accordance with the present invention.

DESCRIPTION OF PREFERRED EMBODIMENTS

A self-propelling forage harvester in accordance with the present invention has a chopper drum identified with reference numeral 1. A torque is transmitted from the chopper drum 1 through a belt drive 2 to a mechanical transmission 3. The belt drive 2 is brought into and out of operation by a tensioning roller 4. The output torque is applied from the transmission 3 through a universal drive shaft 5 to a front chopper attachment 6, for example a pickup or a corn picker. The forage harvester further has two pairs of compression rollers 7, 8 and 7', 8'. The compression rollers are arranged before the chopper drum 1, as considered in a product transporting direction, and after the attachment 6.

The drive of the pair of compression rollers 7, 8 is executed through at least one hydrostatic motor 9 and a transmission 10. Thereby a variable rotary speed can be provided for adjustment of the cutting lengths and during possible reversing. The transmission 10 is switchable by the transmission 3 through a coupling 11. Therefore when the belt drive 2 is switched off, the attachment 6 can be also driven by the hydrostatic motor 9. This is especially advantageous during reversing of the attachment 6 and the compression rollers 7, 8, which is required for a process when the product supply to the chopper drum 1 is interrupted. While the rigid drive of the front attachment 6 from the chopper drum 1 guarantees transmission of a high power to the front attachment, during reversing elasticity (flexibility) in power and rotary speed is possible with the use of the hydrostatic motor 9.

The inventive idea for the forage harvester and the method of operating the same can be utilized in an equivalent manner for example for a combine harvester or similar machines with front attachments, such as cutting attachment for grain, corn picking attachment etc. The compression rollers as a transporting device in the forage harvester correspond here to the transporting device provided between the front attachment and threshing drum, and the chopper drum corresponds to the threshing drum. The inventive idea is therefore applicable to equivalent machines in which supply devices are drivable hydrostatically and regulatably, and the drive of the front attachments after switching off of their mechanical drive, can be executed by switching on of the drive of the supply device.

It will be understood that each of the elements described above, or two or more together, may also find a useful application in other types of methods and constructions differing from the types described above.

While the invention has been illustrated and described as embodied in forage harvester and method of operating the same, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A forage harvester, comprising a front attachment; a mechanical drive for said front attachment; compression rollers; a hydrostatic drive for said compression rollers; and means for connecting said front attachment with said hydrostatic drive of said compression rollers when said mechanical drive of said front attachment is disconnected so as to drive said front attachment from said hydrostatic drive of said compression rollers.

2. A forage harvester as defined in claim 1, wherein said means for connecting said front attachment with said hydrostatic drive of said compression rollers include coupling means.

3. A forage harvester as defined in claim 1, wherein said mechanical drive for said front attachment includes a mechanical driving element and a transmission connected with said mechanical driving element, said hydrostatic drive of said compression rollers including a hydrostatic driving element and a transmission connected with said hydrostatic driving element, said connecting means including a coupling which establishes and interrupts a connection between said transmission of said mechanical drive of said attachment and said transmission of said hydrostatic drive of said compression rollers, so as to correspondingly drive said attachment from said hydrostatic drive of said compression rollers or from said mechanical drive of said attachment.

4. A method of operating a forage harvester having a front attachment with a mechanical drive and compression rollers with a hydrostatic drive, comprising the steps of driving the front attachment by the mechanical drive; driving the compression rollers by the hydrostatic drive; and when needed, disconnecting the mechanical drive from the front attachment and connecting the front attachment with the hydrostatic drive of the compression rollers so as to drive the front attachment from the hydrostatic drive of the compression rollers; and disconnecting the front attachment from the hydrostatic drive of the compression rollers and again connecting the front attachment with the mechanical drive.

5. A method as defined in claim 4, wherein said connecting of the front attachment to and disconnecting of the front attachment from the hydrostatic drive of the compression rollers includes performing said connecting and disconnecting by coupling means.

6. A method as defined in claim 4, wherein the mechanical drive of the attachment includes a mechanical driving element and a transmission, while the hydrostatic drive of the compression rollers includes a hydrostatic driving element and a transmission, said connecting of the front attachment to and disconnecting of the front attachment from the hydrostatic drive of the compression rollers including connecting the transmission of the mechanical drive of the attachment with the transmission of the hydrostatic drive of the compression rollers and disconnecting the transmission of the mechanical drive of the front attachment from the transmission of the hydrostatic drive of the compression rollers.

\* \* \* \* \*